United States Patent [19]

Smith

[11] 4,018,483
[45] Apr. 19, 1977

[54] PROCESS AND APPARATUS FOR DISLODGING AND CONVEYING MATERIAL FROM A SURFACE WITH A POSITIVE PRESSURE FLUID STREAM

[76] Inventor: D. Kermit Smith, 1700 Sabra Drive, Kinston, N.C. 28501

[22] Filed: Aug. 11, 1976

[21] Appl. No.: 713,398

Related U.S. Application Data

[63] Continuation-in-part of Ser. No. 507,046, Sept. 18, 1974, abandoned.

[52] U.S. Cl. .................................. 302/25; 15/405; 15/409; 302/51; 302/58
[51] Int. Cl.² ...................... B65G 53/10; A47L 5/00
[58] Field of Search ............ 15/345, 346, 405, 409; 302/58, 25, 36, 51; 239/DIG. 7

[56] References Cited

UNITED STATES PATENTS

| | | | |
|---|---|---|---|
| 663,943 | 12/1900 | Thurman | 15/405 |
| 688,559 | 12/1901 | Thurman | 15/405 |
| 751,786 | 2/1904 | Elston | 15/409 |
| 1,211,902 | 1/1917 | Warner | 15/346 |
| 2,052,869 | 9/1936 | Coanda | 239/521 |
| 2,497,435 | 2/1950 | Branneman | 15/405 |
| 2,932,845 | 4/1960 | Rydberg | 15/346 |
| 3,078,496 | 2/1963 | Doran et al. | 15/346 |
| 3,316,657 | 5/1967 | Haywood | 302/29 |
| 3,512,206 | 5/1970 | Young | 15/346 |
| 3,704,482 | 12/1972 | Brannon | 15/409 |

Primary Examiner—Johnny D. Cherry
Assistant Examiner—Jeffrey V. Nase

[57] ABSTRACT

Disclosed is a process and apparatus for dislodging and conveying material from a surface and into a discharge duct with a positive pressure, high velocity stream of fluid from a jet device wherein the fluid stream is controlled by using wall attachment means comprising an unenclosed coanda surface located adjacent to the jet device and disposed on a side of the stream opposite to that of the material to be conveyed, whereby the stream attaches to the coanda surface and the stream and entrained material is directed along the coanda surface and into a discharge duct and then directed into a collection device.

19 Claims, 7 Drawing Figures

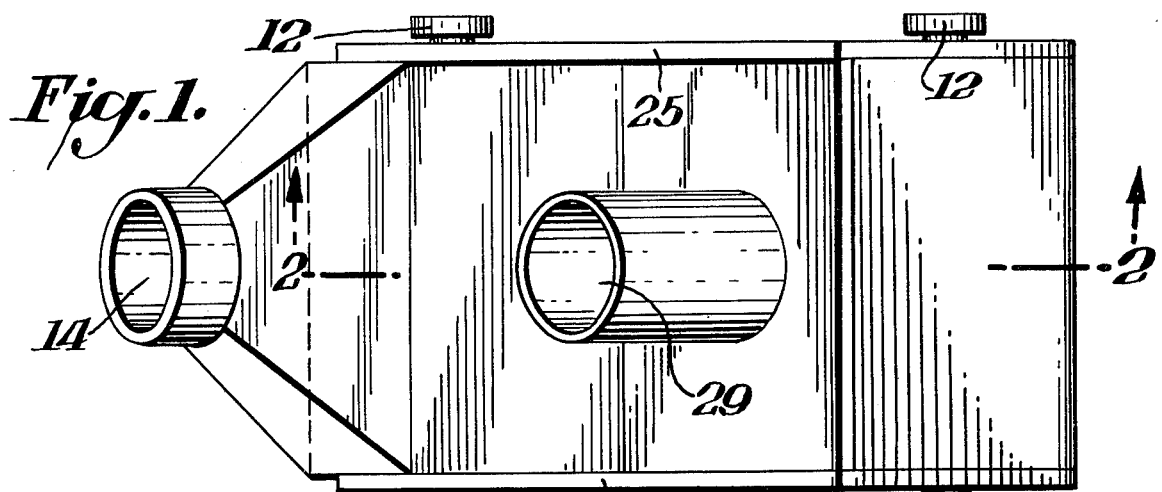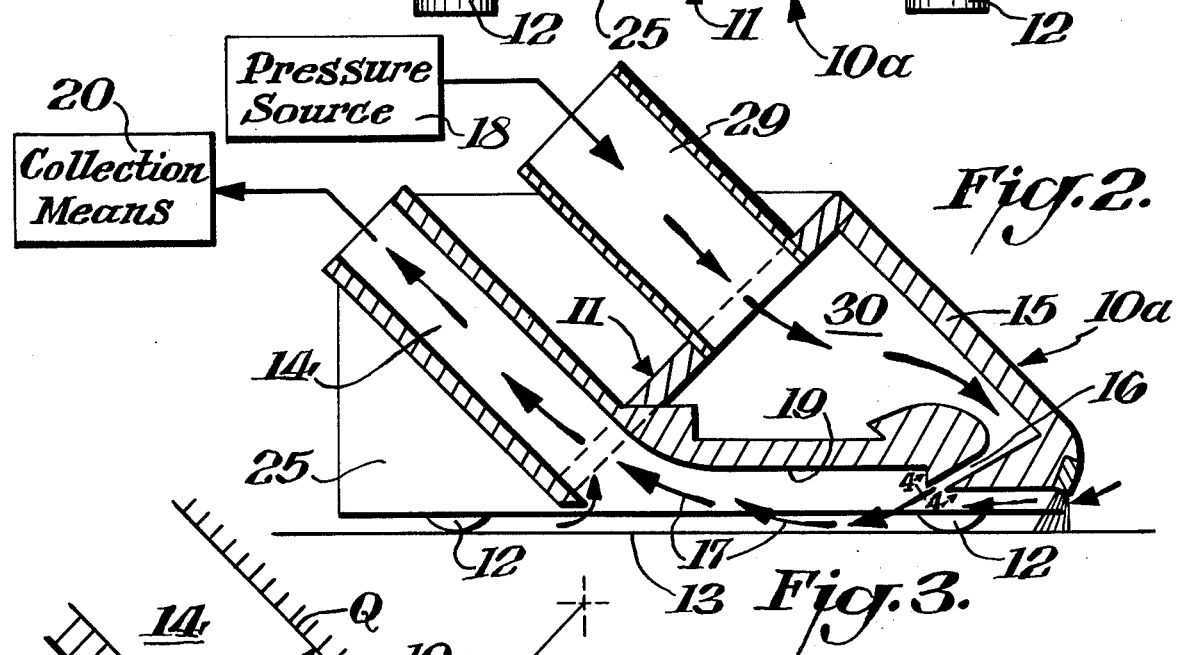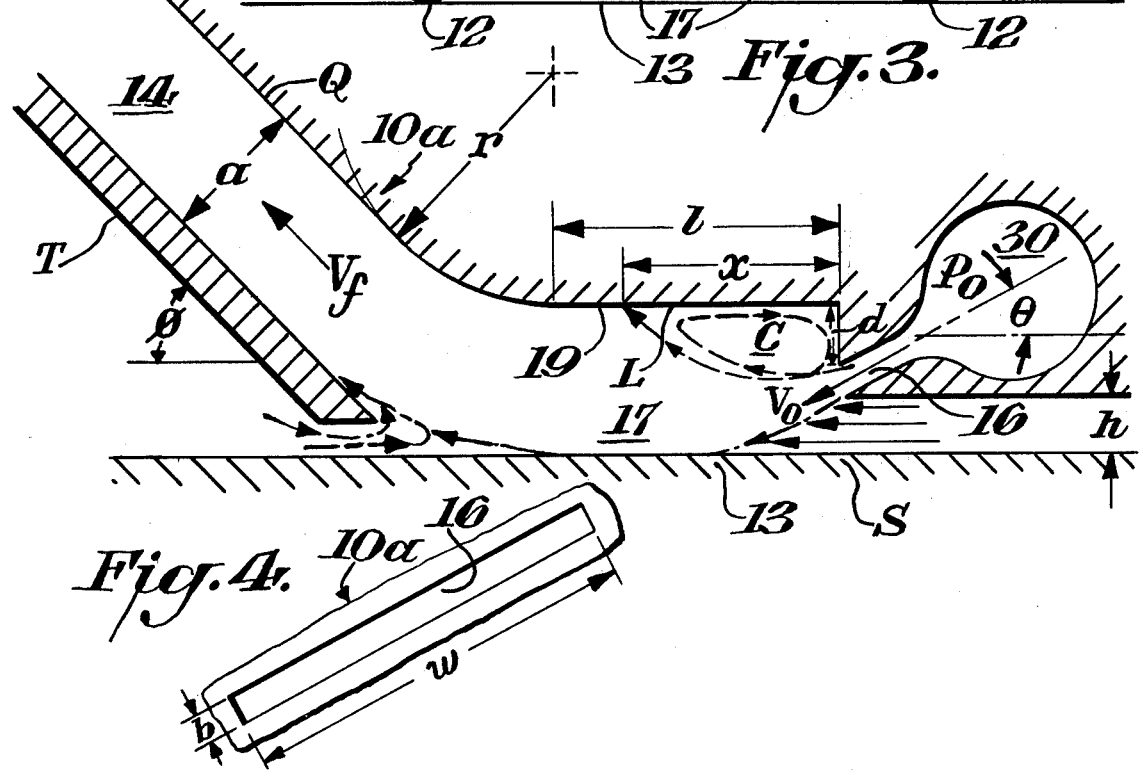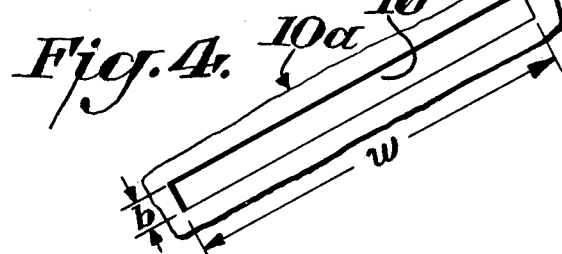

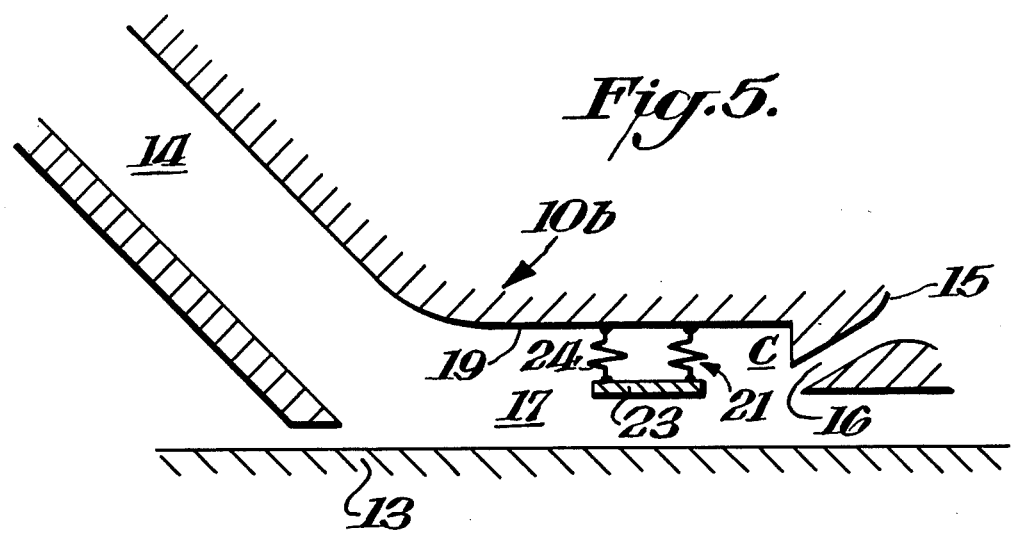
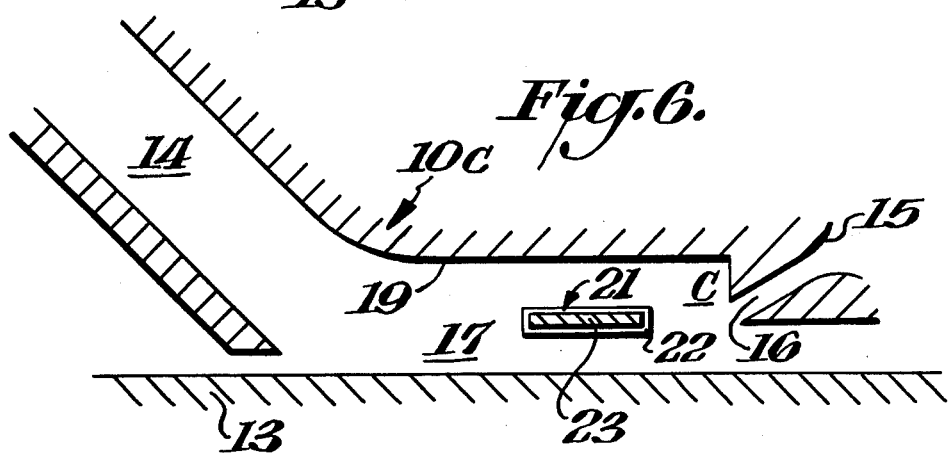
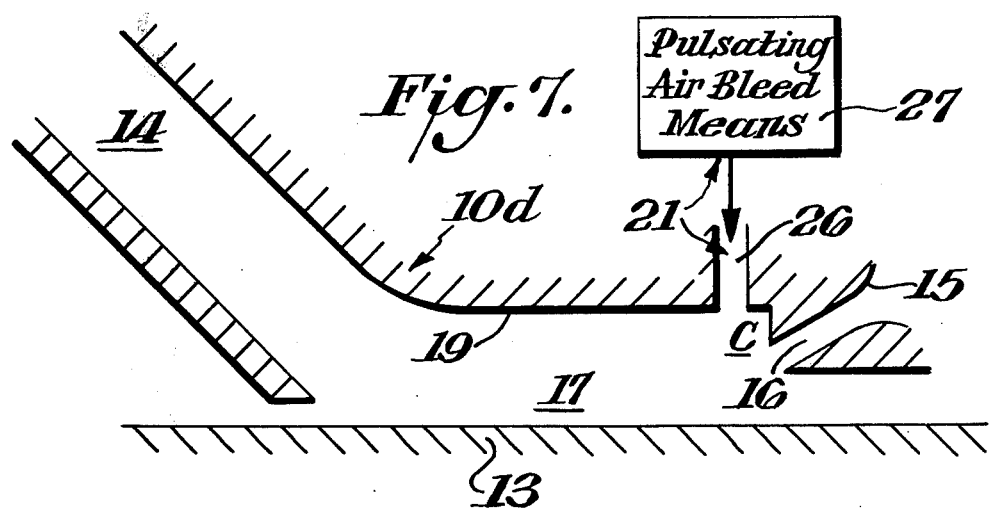

PROCESS AND APPARATUS FOR DISLODGING AND CONVEYING MATERIAL FROM A SURFACE WITH A POSITIVE PRESSURE FLUID STREAM

RELATIONSHIP TO OTHER APPLICATIONS

This application is a continuation-in-part application of my co-pending application Ser. No. 507,046, filed Sept. 18, 1974, now abandoned.

BACKGROUND OF THE INVENTION

Numerous methods and apparatus exist for dislodging and removing particulate materials that involve the impingement of a positive pressure fluid stream onto the surface containing the material or surface defined by the particulate material. Such operations are generally performed under one or some combination of the following circumstances; (1) the fluid stream is not controlled after impingement, (2) the apparatus being used must match the surface containing the particulate material such that a total enclosure results to contain the material-bearing stream after impingement, and (3) a vacuum system is used in conjunction with the positive pressure stream such that at least as much or more fluid stream is vacuumed away from, as is supplied by the positive pressure stream.

More generally, three basic fluid methods are known for mobilizing and transporting particulate materials; (1) processes using only suction, (2) processes using only pressure, and (3) processes using both suction and pressure.

Generally, according to the processes using suction, the mobilizing of materials and subsequent injection of the material into the suction system fluid stream for transport to a remote location is accomplished by having a small opening at the system entrance such that fluid velocities are sufficient to entrain materials close to the opening and/or by some mechanical assist such as a rotating brush or beater, a screw conveyor, etc. or by gravity. Such systems are used in floor, street, and yard cleaners and bulk material conveyors. Such systems require that the material being transported either pass through the prime mover or be collected between the source and the prime mover. Passing particulate materials through the prime mover restricts application to uses where some damage to the material or to the prime mover is acceptable, or to uses where the material is not abrasive to the prime mover. Having a collector between the source and the prime mover requires a collector structually sufficient to withstand the negative pressure within.

According to the processes using positive pressure primary fluid only, mobilization of, and injection of the material into the system for transport is accomplished by entrained secondary fluid drag like in a venturi nozzle, or by gravity, or by some mechanical means of isolation and transport against the pressure differential such as air lock rotating vanes. Relying upon secondary entrained fluid to mobilize and inject material into the positive pressure system is inherently inefficient. Depending upon a mechanical means to accomplish the same restricts application and efficient utilization of the internal fluid energy.

According to the processes using primary fluid in both suction and positive pressure, initial mobilization and injection of the material into the system is normally accomplished in the same manner as is the aforementioned processes using only suction; the distinguishing point being that in the combination suction-positive pressure process, substantial material transport is accomplished using the positive pressure part of the system. Such processes require material passing directly through the prime mover from the suction intake to the positive pressure exit or to bypass the prime mover by being separated from the material bearing fluid at the suction side, normally by a cyclone type apparatus, and then being reinjected into the positive pressure side, normally by some mechanical means such as an air lock.

The following are typical patents describing methods of the type pointed out above: U.S. Pat. No. 2,723,498 to Hastrup and Pinkerton, dated Nov. 15, 1955; U.S. Pat. No. 2,932,845, to Rydberg, dated Apr. 19, 1960; U.S. Pat. No. 3,048,876 to Kemnitz, dated Aug. 14, 1962; U.S. Pat. No. 3,075,227, to Bowles dated Jan. 29, 1963; U.S. Pat. No. 3,078,496, to Doran et al., dated Feb. 26, 1963; U.S. Pat. No. 3,306,672, to Kleiner et al., dated Feb. 28, 1967; U.S. Pat. No. 3,381,869, to Smith, dated May 7, 1968; U.S. Pat. No. 3,512,206, to Young, dated May 19, 1970; and U.S. Pat. No. 751,786, to Elston, Jr., dated Feb. 9, 1904.

In addition to providing a process without the shortcomings of the procedures discussed above, this invention provides a means whereby a positive pressure fluid jet can be directly applied to, and transport therefrom, materials, with those advantages over a vacuum jet that are inherent to a positive jet, such as wide ranges of fluid energy control and action-at-a-distance from the jet nozzle, but without the disadvantages of controlling and containing the subsequent material-bearing positive pressure fluid stream that exist in known procedures.

This invention also provides a process and apparatus using a positive pressure primary fluid jet for dislodging and transporting materials, that is not limited in efficiency by having to rely upon entrained secondary fluid to dislodge and input materials into the primary positive pressure fluid stream, or that must have some mechanical means of injecting the material into the primary stream.

This invention further provides means for improving the ability of the positive pressure fluid jet to dislodge and mobilize particulate materials by disturbing or perturbating the stream via mechanical means thereby causing high frequency agitation of the particulate materials. These and other apparatus and processes for obtaining these results and advantageous over existing methods are more fully described below.

SUMMARY OF THE INVENTION

The process of this invention is defined as a process improvement for dislodging and conveying material from a surface and into a discharge duct with a positive pressure, high-velocity stream of fluid from a jet device; the improvement of locating the jet device away from the material to be conveyed and jetting the fluid to impinge obliquely onto or to pass in close proximity to the material to dislodge and entrain the material, flowing the stream and entrained material across an unenclosed coanda surface means located adjacent to the jet device and disposed on a side of the stream opposite to that of the material to be conveyed to provide wall-attachment of the stream and entrained material to the coanda surface means for directing the stream and entrained material into the duct, and then directing the stream and entrained material into the discharge duct.

It is preferred that the stream and the entrained material be flowed across the unenclosed fluid impervious surface that curves gradually into the discharge duct to cause the stream and material to follow the curved surface and to pass through the discharge duct.

It is preferred that the fluid be jetted in a direction relative to the plane of said coanda surface means at an inclined angle within the range of about 2° to 60° and it is more preferred for more stable operation that the angle be with 10° to about 45°.

The stream and the entrained material are preferably directed into the discharge duct with said material and stream having a direction of flow relative to the plane of the coanda surface that forms an angle within the range of about 30° to about 90° between the plane of the coanda surface and the direction of flow.

It is desirable to have perturbating means for perturbating the high velocity stream prior to the stream passing onto or in close proximity to the material to be conveyed to cause the high velocity stream to agitate at a high frequency to provide for more efficient dislodgment and entrainment of the material by the stream.

The fluid can be gaseous, air, liquid, or any other medium or combination that is capable of being jetted into a high velocity stream as long as the environmental fluid is of approximately the same density.

The process is desirable for conveying any type of material from a surface including particulate matter or sheet material.

It is desirable that the fluid jetting from the jet device have a Reynolds number greater than 1,000.

The apparatus of this invention is defined as an apparatus for dislodging and conveying material away from a surface and into a discharge duct comprising the combination of a fluid jet device having a stream forming orifice disposed to jet fluid in an unenclosed path that is oblique to the surface containing the material to be conveyed to impinge upon or pass in close proximity to the material to cause the stream to dislodge and entrain the material, means for supplying fluid under pressure to the jet device, a duct to receive the stream and entrained material, an unenclosed coanda surface means disposed adjacent to the orifice and between the orifice and the duct with said coanda surface means terminating at the entrance of said duct to provide wall attachment of the stream and entrained materials to the coanda surface and guiding of the stream and entrained materials into the duct.

It is preferred that the coanda surface means comprises an unenclosed fluid impervious surface curving gradually to the duct and operatively associated with the duct whereby the stream and entrained material will follow said curved surface and pass into the duct.

The plane of the coanda surface means and the path of the stream forming orifice form an angle with respect to each other within the range of about 2° to about 60°. It is more preferred that the angle be within the range of about 10° to about 45°.

It is preferred that the duct and the coanda surface are arranged and disposed with respect to each other such that the flow path provided by said discharge duct forms an angle with the plane of said coanda surface within the range of about 30° to about 90°.

In order to provide even more efficient dislodgment and entrainment of the material to be conveyed by the stream being jetted from the jet device, it is desirable that high frequency perturbating means be disposed adjacent to the path of the stream forming orifice to cause the high velocity stream exiting from the orifice to agitate at a high frequency whereby more efficient dislodgment and entrainment of the material to be conveyed occurs.

It is desirable that the stream forming orifice have a finite aspect ratio greater than 1 and it is more preferable that the aspect ratio be greater than 4.

The apparatus can have collection means operatively associated with the discharge duct to separate and collect the material from said stream, if desired.

BRIEF DESCRIPTION OF THE DRAWINGS

FIG. 1 is a top plan view of a typical apparatus of the invention with the collection means 20 and the pressure source 18 removed for clarity.

FIG. 2 is a cross sectional view of FIG. 1 taken through section line 2—2 of FIG. 1.

FIG. 3 is a schematic illustration of the apparatus and process of the invention wherein the various parameters are illustrated as is more fully described in the "Detailed Description of the Invention."

FIG. 4 is a section taken from FIG. 2 along section line 4—4 illustrating the stream forming orifice of the apparatus of the invention.

FIGS. 5, 6, and 7 are broken away sectional side views of an apparatus of the invention wherein various perturbating means are illustrated for providing more efficient dislodgment and conveying of material by a given stream of fluid.

DETAILED DESCRIPTION OF THE INVENTION

FIG. 1 illustrates a typical apparatus 10a of the instant invention. With reference to FIG. 1 the frame and body 11 of the apparatus is supported by wheels 12 for mobility. The entrance duct 29 provides an entrance for the high pressure fluid that is to be discharged through the stream forming orifice 16. With reference to FIG. 1 the pressure source that is operatively associated with entrance duct 29 is removed for clarity but the pressure source 18 is illustrated in FIG. 2. Likewise, collection means 20 is removed from FIG. 1 but the collection means 20 is operatively associated with discharge duct 14 as illustrated in FIG. 2. The apparatus 10a of FIG. 1 has side panels 25 thereby giving the apparatus and orifice 16 a finite aspect ratio.

FIG. 2 is a cross sectional view taken along section line 2—2 of FIG. 1 further illustrating the apparatus of the invention. Fluid under pressure from pressure source 18 enters the apparatus through entrance duct 29 and passes into high pressure plenum 30. The high pressure fluid within plenum 30 then exits through stream forming orifice 16 having a finite aspect ratio and it then impinges or passes in close proximity to surface 13 containing material to be dislodged and conveyed. The stream follows path 17 because of coanda surface means 19 that provides the "coanda effect" resulting in wall attachment of the stream that is then guided into discharge duct 14 operatively associated with collection means 20. The fluid jet device of the apparatus is generally designated at 15. The space "C" represents a zone of lower pressure with respect to the pressure with respect to the pressure on the opposite side of the stream path 17 having clockwise flow as shown in FIG. 2. Such result is inherently provided whenever the "coanda effect" is taking place. Zone "C" is also defined as a cavity with respect to the convex portion of the coanda surface adjacent the discharge duct and the lip of the exit orifice.

FIG. 4 is a sectional view taken along section line 4—4 of FIG. 2 illustrating stream forming orifice 16 with the orifice having dimensions b and w thereby having a finite aspect ratio w/b. The exit of stream forming orifice 16 has an upper terminal portion forming a lip as shown at the bottom of arrow "d".

FIGS. 5, 6, and 7 illustrate high velocity perturbating means for producing more efficient operation resulting in an enhanced degree of dislodgment and entrainment of material by the high velocity stream.

With reference to FIG. 5, the apparatus 10b contains perturbating means 21 comprising slat 23 extending longitudinally across the width of the apparatus. The slat is suspended within the chamber or stream path 17 by springs 24 appropriately located, designed, and disposed to provide high frequency vibration of slat 23 when subjected to the high velocity stream exiting from stream forming orifice 16. The slat vibrates in much the same fashion as does the slat in a venetian window blind when subjected to a certain wind velocity. Depending upon the particular processing conditions involved, the dimensions of the slat, and the material as well as other variations, the slat may be designed and disposed for maximum efficiency under any given set of conditions.

FIG. 6 refers to apparatus 10c having perturbating means 21 comprising a thin slat-like member 23 extending longitudinally across the chamber or stream path 17 within the path of the stream exiting from stream forming orifice 16. The slat 23 is contained within slots 22 that are located within side plates 25 as shown in FIGS. 1 and 2.

FIG. 7 refers to apparatus 10d having another type of perturbating means 21 comprising a controlled bleed orifice 26 operatively associated with high speed, pulsating air bleed means whereby the stream exiting from the stream forming orifice 16 is caused to vibrate at a correspondingly high frequency. Such vibration follows as the lower pressure area within the lower pressure zone "C" of Figure 3 is varied that disturbs the stream FIG. 3 is a schematic diagram illustrating the various parameters defining the process and apparatus of the invention.

DEFINITION OF SYMBOLS DEFINING THE APPARATUS

With reference to FIG. 3 the following definitions are relative to the nomenclature depicted thereon.

Apparatus Nomenclature: $l$ — Length of the straight horizontal section (L) of the adjacent coanda surface 19.

$r$ — Radius of curvature of the adjacent coanda surface 19 at the end of the straight section L and at the entrance of the enclosed discharge duct 14.

$\theta$ — Angle of the stream forming orifice 16 relative to the straight section 1.

$d$ — Distance of orifice 16 mouth from the straight section L. Note that Lines L and $d$ may be imaginary lines forming a right angle with the orifice mouth and the terminus of the coanda surface.

$\phi$ — The angle of the enclosed duct 14 relative to the straight section L.

$Q$ — continuation of the adjacent surface after radius r though angle $\phi$.

$T$ — A second surface that together with Q describes the enclosed duct 14.

$a$ — Width of the enclosed discharge duct 14.

$S$ — The working surface 13 from which particulate materials can be dislodged and transported through the enclosed duct 14.

$x$ — Distance along the straight section L at which point the primary stream of fluid from orifice 16 attaches to the adjacent surface 19.

$c$ — Region of circulation flow defined by the surface 19 (L) and d plus the side of the primary jet leaving the orifice 16. Within C the pressure is below the pressure prevailing adjacent to the work surface 13 and S.

$w$ — Length of the orifice 16 as shown in FIG. 4.

$b$ — Width of orifice 16 as shown in FIG. 4.

$A_R$ — Aspect ratio of the orifice = w/b.

Process Nomenclature:

$Re$ — Reynold's number characterizing the fluid flow through orifice 16.

$Po$ — is plenum 30 gauge pressure.

$d: 0 \leq d \leq 10b$.

$\phi$: The preferred limit for $\phi$ is from about 30°–90°. However, if for some design reason a larger angle of rotation is needed, the straight surface T can be curved, say at a radius $(r + a)$ and the enclosed duct could be eventually directed at any direction. Also the enclosed duct in FIGS. 1, 3, and 4 is rectangular. The rectangular duct can then be transformed into other, more convenient shapes (e.g. circular) at some finite distance away from the surface S as in FIG. 1.

$a$: $a$ is preferably variable by allowing surface T to move closer to or further away from surface Q. Maintenance of the fluid stream's residual kinetic energy is provided as the stream enters the duct. If the duct is too large it will act as a diffuser and destroy fluid energy; if too small the duct will pressurize causing a head pressure that may result in some of the fluid stream overflowing the duct entrance. The duct's variability in area is desirable because for different flow conditions or different conditions of surface S, differing amounts of primary and secondary fluid flows into the duct.

$A_R$: $A_R \geq 1$ as an extreme limit; for practical reasons of maintaining flow essentially two-dimensional in character, preferably $A_R \geq 4$.

$V_o$ — Is the initial velocity of the axis of the stream exiting from orifice 16.

$V_f$ — Is the final velocity of the axis of the stream and any entrained material exiting into discharge duct 14.

EXAMPLES

The examples enumerated below are presented in tabular form. The nomenclature and parameters referred to are those as described for the schematic illustrated and described with reference to FIG. 3. In the Examples, unless otherwise stated the fluid utilized is air at about room temperature.

TABLE OF EXAMPLES

| Example No. | Θ | b (in.) | w (in.) | $A_R$ (PSIG) | $P_o$ | $R_e$ | Type Coanda Surface | d (in.) | l (in.) | h (in.) | r (in.) | a (in.) | φ |
|---|---|---|---|---|---|---|---|---|---|---|---|---|---|
| 1 | 45° | 0.05 | 6.0 | 120 | 0.40 | 3,162 | straight | 0 | 2.0 | 0.188 | 1.0 | 0.75 | 45° |
| 2A | 30° | 0.042 | 7.44 | 177 | 0.43 | 2,754 | straight | 0 | 1.0 | 0.375 | 1.0 | 0.75 | 60° |
| 2B | 30° | 0.042 | 7.44 | 177 | 0.43 | 2,754 | cavity with brush | 0.125 | 1.0 | 0.375 | 1.0 | 0.75 | 60° |
| 2C | 30° | 0.042 | 7.44 | 177 | 0.43 | 2,754 | cavity with vertical brush in discharging duct | 0.125 | 1.0 | 0.375 | 1.0 | 0.75 | 60° |
| 3 | 30° | 0.438 | 17.0 | 38.8 | 0.69 | 36,383 | straight | 0 | 6.0 | 2.0 | 6.0 | 5.50 | 45° |
| 4 | 45° | 0.563 | 12.0 | 21.3 | 0.76 | 49,081 | straight | 0 | 4.0 | 2.0 | 6.0 | 8.0 | 90° |
| 5 | 30° | 0.015 | 1.375 | 91.7 | 60 | 11,620 | straight | 0 | 1.8 | 0 to 1.0 | 1.0 | | 90° |

In Examples 1 and 2 the efficiency of the apparatus is greatly enhanced with regard to dislodgment and entrainment of material from the surface by the installation of perturbating means as illustrated in FIG. 6. A 1/16 inch by 1 inch balsa wood strip is inserted as illustrated in FIG. 6 and a high frequency vibration is produced that correspondingly causes the stream to perturbate and enchance the efficiency of that stream. The same results are achieved with a 17 mil. by 1 inch metal shim strip so installed. Of course, with the metal shim strip, the durability of the perturbating means is greatly enhanced.

Example 3 is also modified to provide perturbating means in accordance with FIG. 7. The air bleed orifice is alternately opened and closed mechanically at a high frequency which likewise produces perturbation of the stream exiting from orifice 16 resulting in an enhanced dislodgment and entrainment of material.

In all the examples the process produced highly effective cleaning of carpets, lawns or floors including concrete surfaces.

Many other embodiments and illustrations of the invention can be envisioned for specific functions involved in a wide ranging variety of end uses.

The apparatus and process of this invention is highly useful in cleaning operations. For instance, the invention is useful for air cleaning to both the domestic and institutional user for such end uses as cleaning floors, carpets, curtains, streets, yards, lawns, parking lots, sports fields, snow removal and the like. The invention is also useful for cleaning and drying operations wherein the condition of the fluid is maintained to produce the correct degree of drying. Such a typical use is sports fields having artificial turf, patios, carpets or the like. The invention is also useful with hand cleaners for shops, work benches, removing metal, wood shavings and other debris. The apparatus can also be a permanent attachment to any metal or woodworking machines to pick up and carry away all excess materials.

The invention is also useful in air cleaning operations wherein additive detergent particles are included with the primary fluid. In addition, of course, the additive particles could be abrasive in order to achieve a certain desired end result. Air cleaning operations can also be carried out with the primary fluid being air mixed with other fluids such as water, steam, freons, foams, solvents or the like to provide the precise end result intended.

Other primary fluids can be used such as in steam cleaning, cleaning swimming pools with water as the medium, or the like.

Another field of the invention is in bulk conveying. Such materials that are handled are grain, powdery or granular materials, pellets, sawdust, wood shavings, metal shavings and any similar type material.

The process and apparatus of the invention is likewise useful in dredging operations wherein the primary fluid is water and the material that is entrained and carried away into the discharge duct is the mud or the material on the surface being dredged.

The embodiments of the invention in which an exclusive property or privilege is claimed are defined as follows:

1. An apparatus for dislodging and conveying material from a normally horizontal material containing surface normally upwardly through a discharge duct and into associated collection means, comprising, in combination:
   a. a fluid jet device having a stream forming exit orifice disposed above and away from the material to be conveyed to jet fluid in an unenclosed path that is oblique to the surface containing material to be conveyed to impinge upon the material containing surface to cause the stream to dislodge and entrain the material, said exit orifice having a normally upper terminus forming a lip;
   b. means for supplying fluid under pressure to the jet device;
   c. a discharge duct adapted to receive the stream and entrained material;
   d. an unenclosed fluid impervious coanda surface disposed adjacent to the lip of the exit orifice and above the stream path between the lip of the exit orifice and the duct with said fluid impervious coanda surface terminating at the entrance of said discharge duct, said fluid impervious coanda surface having a cavity located immediately adjacent and above a horizontal projection of the lip of the exit orifice to provide separation of the stream path from the fluid impervious coanda surface, said fluid impervious coanda surface further having a convex terminal surface with respect to the stream path operatively associated with the discharge duct to assist in providing for reattachment of the stream path to the fluid impervious coanda surface and directing and guiding the stream and entrained material through the discharge duct and into the associated collection means: and
   e. means for allowing substantial fluid outside of said apparatus to freely enter into said apparatus on a side of said stream path away from said exit orifice of said jet device to provide a zone of lower fluid pressure within the cavity adjacent the lip of the exit orifice on the side of said path opposite to the side containing the material to be conveyed with respect to a higher fluid pressure zone on the side of the path towards the material to be conveyed to provide separation of said stream from said fluid impervious coanda surface prior to impingement of said stream onto said material containing surface to dislodge and entrain the material with said stream and entrained material then reattaching to and flowing along said fluid impervious coanda surface to further provide wall-attachment of the stream and entrained material to the fluid impervious coanda surface.

2. The apparatus of claim 1 wherein the unenclosed fluid impervious coanda surface comprises an unenclosed fluid impervious coanda surface curving gradually into the discharge duct and operatively associated with the discharge duct whereby the stream and entrained material are directed to follow said curved surface and pass into the discharge duct.

3. The apparatus of claim 1 wherein the material containing surface is defined by a plane and the path of the stream forming path forms an angle with respect to the plane within the range of about 10° to about 45° with respect to the plane.

4. The apparatus as defined in claim 1 wherein the discharge duct and a plane defining the material containing surface are arranged and disposed with respect to each other such that the flow path provided by said discharge duct forms an angle with the plane of said material containing surface within the range of about 30° to about 90°.

5. The apparatus as defined in claim 1 wherein high frequency perturbating means are disposed adjacent to the path of the stream-forming orifice to cause a high velocity stream exiting from the orifice to agitate at a high frequency to provide for more efficient dislodgment and entrainment of the material to be conveyed by said stream.

6. The apparatus as defined in claim 1 wherein the stream forming orifice has an aspect ratio greater than 1.

7. The apparatus as defined in claim 1 wherein the stream forming orifice has an aspect ratio greater than 4.

8. The apparatus of claim 1 wherein the coanda surface is disposed at a finite distance above said exit orifice to provide the cavity.

9. The apparatus as defined in claim 1 wherein said cavity and the lip of the exit orifice comprises a concave surface intersecting the exit orifice and operatively associated with the convex terminal surface of the fluid impervious coanda surface with respect to the stream path.

10. The apparatus as defined in claim 1 wherein a horizontal projection of the lowest portion of the convex terminal surface of the fluid impervious coanda surface is vertically disposed above the lip of the exit orifice.

11. In a process for dislodging and conveying material from a normally horizontal material containing surface and normally upwardly into a discharge duct with a positive pressure, high-velocity stream of fluid from an unenclosed jet device; the improvement comprising:

a. jetting the fluid from an exit jet having an upper side terminating to form a lip to impinge obliquely onto the material containing surface to dislodge and entrain the material by locating the exit jet above and away from the material to be conveyed;
b. maintaining a zone of lower fluid pressure in a cavity above said high-velocity stream of fluid adjacent the lip of the exit jet of the jet device with respect to the fluid pressure in a zone of higher pressure on the opposite side of said high-velocity stream, by,
  1. flowing the stream and entrained material adjacent an unenclosed fluid impervious coanda surface located adjacent to the lip of the exit jet of the jet device and disposed normally above the stream on a side of the stream opposite to that of the material to be conveyed, said fluid impervious coanda surface having said cavity located immediately adjacent and above the lip of the exit jet device, and
  2. allowing substantial fluid outside of said jet device to flow into said zone of higher pressure;
  to provide separation of said stream from said fluid impervious coanda surface prior to impingement of said stream onto said material containing surface to dislodge and entrain the material with said stream and entrained material then reattaching to and flowing along said fluid impervious coanda surface to further provide wall-attachment of the stream and entrained material to the fluid impervious coanda surface; and then
c. directing and guiding the stream and entrained material into the discharge duct and associated collection means.

12. The process of claim 11 comprising jetting the fluid in a direction relative to the material containing surface defined by a plane at an inclined angle within the range of about 10° to about 45° with respect to the plane.

13. The process as defined in claim 11 comprising directing the stream and the entrained material into the discharge duct with said stream and material having a direction of flow relative to the material containing surface defined by a plane that forms an angle within the range of about 30° to about 90° between the plane of the material containing surface and the direction of flow.

14. The process as defined in claim 11 comprising perturbating the high velocity stream prior to the stream impinging onto the material containing surface to cause the high velocity stream to agitate at a high frequency to provide for more efficient dislodging and entrainment of the material by said stream.

15. The process as defined in claim 11 wherein the fluid is gaseous.

16. The process as defined in claim 11 wherein the fluid is air.

17. The process as defined in claim 11 wherein the material to be dislodged and conveyed comprises finely divided particulate matter.

18. The process as defined in claim 11 wherein the fluid jetting from the jet device has a Reynolds Number greater than about 1000.

19. The process as defined in claim 11 comprising locating the fluid impervious coanda surface a finite distance above the normal position of the exit jet of the jet device to provide the cavity.

* * * * *